(12) United States Patent
     Han (10) Patent No.: US 12,041,377 B2
(45) Date of Patent: Jul. 16, 2024

(54) VIDEO SOURCE SWITCHING METHOD, PLAYING METHOD, APPARATUS, DEVICE, AND STORAGE MEDIUM

(71) Applicant: TENCENT TECHNOLOGY (SHENZHEN) COMPANY LIMITED, Shenzhen (CN)

(72) Inventor: Cunai Han, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 17/942,920

(22) Filed: Sep. 12, 2022

(65) Prior Publication Data

US 2023/0007188 A1  Jan. 5, 2023

Related U.S. Application Data

(63) Continuation of application No. PCT/CN2021/102625, filed on Jun. 28, 2021.

(30) Foreign Application Priority Data

Jul. 31, 2020 (CN) .......... 202010758051.6

(51) Int. Cl.
    H04N 21/43    (2011.01)
    H04N 5/268    (2006.01)
    H04N 21/462   (2011.01)

(52) U.S. Cl.
    CPC ......... *H04N 5/268* (2013.01); *H04N 21/4307* (2013.01); *H04N 21/4622* (2013.01)

(58) Field of Classification Search
    CPC .............. H04N 5/268; H04N 21/4307; H04N 21/4622
    See application file for complete search history.

(56) References Cited

U.S. PATENT DOCUMENTS

| 10,885,362 B2 | 1/2021 | Lin |
| 2010/0214473 A1 | 8/2010 | Kanai |

(Continued)

FOREIGN PATENT DOCUMENTS

| CN | 101815197 A | 8/2010 |
| CN | 106162316 A | 11/2016 |

(Continued)

OTHER PUBLICATIONS

China National Intellectual Property Administration (CNIPA) Office Action 1 for 202010758051.6 Dec. 31, 2020 11 Pages (including translation).

(Continued)

*Primary Examiner* — Kyu Chae
(74) *Attorney, Agent, or Firm* — ANOVA LAW GROUP, PLLC (57) ABSTRACT

This application discloses a video source switching method, a playing method, an apparatus, a device, and a storage medium. The video source switching method includes obtaining switching information; determining a first key frame of a first video source according to the switching information, the first key frame being a next key frame of a current playing time of the first video source; querying a first time value of the first key frame; identifying a second video source according to the switching information; and switching video sources if a distance between a current time value of the second video source and the first time value is less than or equal to a threshold.

18 Claims, 8 Drawing Sheets

(56) References Cited

U.S. PATENT DOCUMENTS

| | | | |
|---|---|---|---|
| 2013/0091297 A1* | 4/2013 | Minder | H04N 21/4384 |
| | | | 709/231 |
| 2015/0089544 A1* | 3/2015 | Kim | H04N 21/47214 |
| | | | 725/38 |
| 2017/0302990 A1 | 10/2017 | Ying | |
| 2019/0037270 A1 | 1/2019 | Arpirez et al. | |

FOREIGN PATENT DOCUMENTS

| CN | 109168078 A | 1/2019 |
|---|---|---|
| CN | 109246462 A | 1/2019 |
| CN | 109495761 A | 3/2019 |
| CN | 110139148 A | 8/2019 |
| CN | 110536175 A | 12/2019 |
| CN | 110636338 A | 12/2019 |
| CN | 111866433 A | 10/2020 |

OTHER PUBLICATIONS

The World Intellectual Property Organization (WIPO) International Search Report for PCT/CN2021/102625 Sep. 28, 2021 7 Pages (including translation).

* cited by examiner

VIDEO SOURCE SWITCHING METHOD, PLAYING METHOD, APPARATUS, DEVICE, AND STORAGE MEDIUM

RELATED APPLICATIONS

This application is a continuation application of PCT Application No. PCT/CN2021/102625, filed on Jun. 28, 2021, which claims priority to Chinese Patent Application No. 202010758051.6, entitled "VIDEO SOURCE SWITCHING METHOD, PLAYING METHOD, APPARATUS, DEVICE, AND STORAGE MEDIUM" and filed with the China National Intellectual Property Administration on Jul. 31, 2020. The two applications are both incorporated by reference in its entirety.

FIELD OF THE TECHNOLOGY

This application relates to the field of multimedia processing technologies, and in particular, to a video source switching method, a video playing method, an apparatus, a device, and a storage medium.

BACKGROUND OF THE DISCLOSURE

With the popularity of smart terminals and the development of the Internet, viewing online videos on various smart terminals has become an important part in people's lives. It has become an important task for various online video websites or video APPs to provide users with a better viewing experience. To improve playing quality of network video sources, bit rates of the network video sources are gradually increasing.

During video playing, if a playing error or frame freezing occurs, to ensure normal viewing for a user, an original high bit rate video source needs to be switched to a low bit rate video source. During video source switching, an image after the switching and an image that has been played previously may be discontinuous or repeated. In the related art, to implement video source switching, a player may need to be restarted. However, problems such as a black screen may occur in a smart terminal due to a long switching time.

SUMMARY

To resolve at least one of the foregoing technical problems, embodiments of this application provide a video source switching method, a video playing method, an apparatus, a device, and a storage medium, to achieve smooth switching between different video sources.

One aspect of this application provides a video source switching method. The video source switching method includes obtaining switching information; determining a first key frame of a first video source according to the switching information, the first key frame being a next key frame of a current playing time of the first video source; querying a first time value of the first key frame; identifying a second video source according to the switching information; and switching video sources if a distance between a current time value of the second video source and the first time value is less than or equal to a threshold.

Another aspect of this application provides a video playing method, including obtaining a video switching event, the video switching event including any one of a switching request event, a playing error event, or a frame freezing event from a user terminal; and performing video source switching according to the video switching event, the video source switching being performed by using the foregoing video source switching method.

Another aspect of this application provides a video playing method, including: displaying an image definition information list; playing a video source with corresponding definition in the image definition information list in response to a video playing instruction; and displaying video image definition information or a video source switching prompt after video source switching when a video switching event is triggered, the video source switching being performed by using the foregoing video source switching method.

According to another aspect of this application, a video source switching apparatus is provided, including: an obtaining module, configured to obtain switching information; a localization module, configured to determine a first key frame of a first video source according to the switching information, the first key frame being a next key frame of a current playing time of the first video source; a query module, configured to query a first time value of the first key frame; a second video source localization module, configured to identify a second video source according to the switching information; and a switching module, configured to switch video sources when a distance between a current time value of the second video source and the first time value is less than or equal to a preset threshold.

According to another aspect of this application, a computer device is provided, including a memory and a processor, the memory storing a computer program; and the computer program, when executed by the processor, causing the processor to perform the method described in the foregoing aspect.

According to another aspect of this application, a non-transitory computer-readable storage medium is provided, storing a computer program, the computer program, when executed by a processor, causing the processor to perform the method described in the foregoing aspect.

DESCRIPTION OF EMBODIMENTS

This application is further described below with reference to the accompanying drawings and specific embodiments of this specification. The described embodiments are not to be considered as a limitation to this application. All other embodiments obtained by a person of ordinary skill in the art without creative efforts shall fall within the protection scope of this application.

In the following descriptions, the term "some embodiments" describes subsets of all possible embodiments, but it may be understood that "some embodiments" may be the same subset or different subsets of all the possible embodiments, and can be combined with each other without conflict.

Unless otherwise defined, meanings of all technical and scientific terms used in this specification are the same as those usually understood by a person skilled in the art to which this application belongs. Terms used in this specification are merely used to describe objectives of the embodiments of this application, but are not intended to limit this application.

Figure 1A:
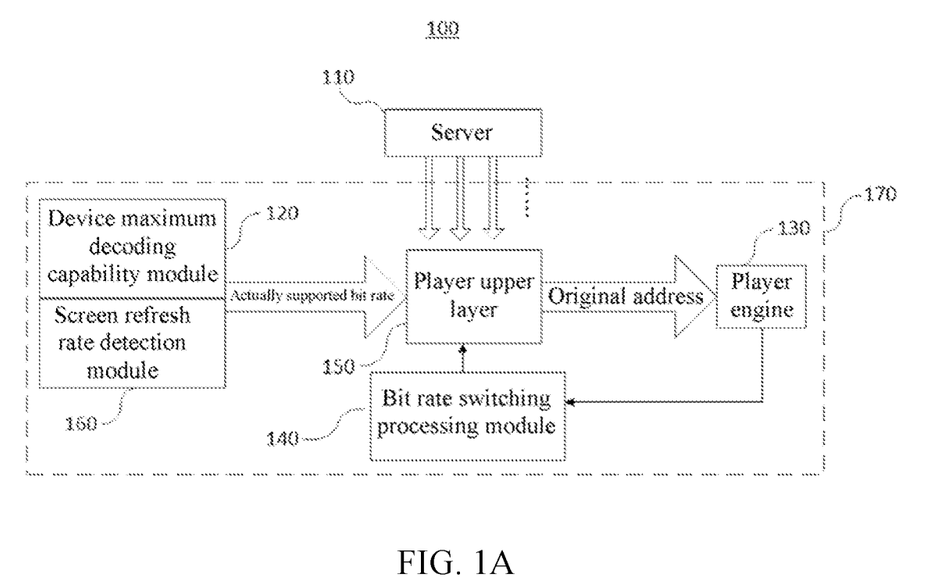
FIG. 1A is a structural block diagram of a video switching system according to an embodiment of this application.

FIG. 1A is a structural block diagram of a video switching system according to an embodiment of this application.

As shown in FIG. 1A, the video switching system 100 includes a server 110 and a player 170. The player 170 may be a related application that provides a video service function. The player 170 may be configured in a user terminal such as a smartphone, a smart wearable device, a tablet computer, a notebook computer, a personal digital assistant, or an on-board computer. The server 110 is configured to provide data of different video sources to the user terminal, and provide a video playing service to the user terminal by using the player 170 installed in the user terminal. The server may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a CDN, big data, and an artificial intelligence platform. For example, the server 110 encodes sources at different bit rates for a specified source. The bit rate refers to the number of data bits transmitted per unit time during data transmission, generally in a unit of kbps (that is, kilobits per second). The bit rate is also referred to as a sampling rate. A higher sampling rate per unit time indicates higher precision of an encoded video file and higher approximation of the video file to an original file. Further, the sources at different bit rates include three sources at different bit rates, that is, a high bit rate source, a medium bit rate source, and a low bit rate source. A specific quantity of the sources is not limited, and may be flexibly set. The different bit rates may be any one of different resolutions, different definitions, and different frame rates. The frame rate refers to the number of frames of pictures transmitted in one second, which may also be interpreted as the number of refreshes per second of a graphics processing unit. The number of frames of pictures displayed per second affects image fluency and is in direct proportion to the image fluency. A higher frame rate indicates more fluent images, and a lower frame rate indicates a stronger sense of jitter of the images. Due to a special physiological structure of human eyes, when a frame rate of images is higher than 16 fps, the images are considered to be continuous. For example, three sources at different frame rates may be used, and frame rates of the three sources at different frame rates may be 30 fps (Frames Per Second), 60 fps, and 120 fps respectively.

As shown in FIG. 1A, the player 170 may include a device maximum decoding capability module 120, a player engine 130, a bit rate switching processing module 140, and a player upper layer 150. The device maximum decoding capability module 120 is configured to query a maximum bit rate capability supported by a current device. Further, an Andorid platform may obtain, via a system interface, maximum bit rate capabilities that the current device can support for different encoding formats and different definitions; and an ios (a mobile operating system of Apple Inc.) platform sets, according to a test result, a device capability supporting playing at a high bit rate.

For example, the maximum bit rate capability may be a maximum frame rate capability. In this embodiment, the player 170 may further include a screen refresh rate detection module 160, which obtains a screen refresh rate of a current system via a system interface. If the screen refresh rate supports a high frame rate mode, it indicates that a rendering side has already supported rendering of a high frame rate video. If the current screen refresh rate does not support the high frame rate mode, modification of the screen refresh rate may be attempted to support a high frame rate, and whether the screen refresh rate is successfully modified may be determined according to an event called back by the system. If the screen refresh rate is successfully modified, a high frame rate video may be played; otherwise, it indicates that the current screen does not support rendering of a high frame rate video.

The player engine 130 plays a video source in a playing address given by the player upper layer 150. In this embodiment, a video source in a playing address at a high frame rate given by the player upper layer 150 is played. In addition, during playing, the player engine 130 detects frame freezing. In this embodiment, the frame freezing is detected by counting a frame loss rate. If the number of frames lost per unit time in a played video reaches a maximum limit, for example, the number of frames lost within 5 seconds exceeds 50, a related event is sent. This indicates that the frame freezing occurs during current playing, which affects user playing. The sent related event includes related frame rate information and error information. In addition, if an error is reported during playing, for example, error information such as unsuccessful playing due to a network cause occurs, a related event is also sent, so that the bit rate switching processing module 140 receives information about a frame freezing event or a playing error event.

The bit rate switching processing module 140 determines whether to perform bit rate reduction processing according to the playing error event and frame freezing event sent by the player engine 130 and a bit rate of a source at which the playing error event and frame freezing event occurs, and informs the player upper layer 150 of video switching event information. The player upper layer 150 performs related operations according to the video switching event information. For example, when a high frame rate source is played, the bit rate switching processing module 140 determines whether to perform frame rate reduction processing according to a frame rate of a source with an error and informs the player upper layer of information about an event that needs to be switched, and the player upper layer performs frame rate reduction and replaying operations. If a playing error event and a frame freezing event due to frame loss occur, and a current frame rate is a high frame rate, for example, 120 fps, the frame rate may be switched to 60 fps. If an error or frame freezing occurs in a source of 60 fps, a frame rate of the source may be switched to 30 fps. However, if a frame rate of a source with an error is 30 fps, error information or a frame freezing prompt is directly sent, so that a user actively switches the frame rate.

In this embodiment, the player upper layer 150 is further configured to obtain a switching request event from the user terminal. For example, when traffic is limited or WiFi is not connected, a user tends to select a low bit rate video source for playing; while when traffic is sufficient and WiFi is reconnected, the user tends to select a high bit rate video source for playing. For example, sources at different bit rates may refer to sources at different frame rates.

Sources at different frame rates are used as an example to illustrate functions of the player upper layer 150. The player upper layer 150 mainly completes playing scheduling of sources at different bit rates. The player upper layer 150 obtains a definition list and a frame rate list of sources currently selected by the user from the server 110, determines whether there is a high frame rate source in the currently selected sources, and determines whether the high frame rate source has a corresponding backup low frame rate source for switching.

If there is a high frame rate source in the server 110, according to an encoding format and resolution of the high frame rate source, a highest frame rate that can be supported by the current encoding format and resolution is obtained. If a frame rate of the high frame rate source is less than the highest frame rate, a decoding side may support decoding of the high frame rate source.

If both decoding and rendering support the high frame rate source, a playing address of the high frame rate source is set to the player engine, and the player 170 starts to play a high frame rate video. Meanwhile, the player upper layer 150 monitors the video switching event and determines whether to perform frame rate switching according to the monitored event. For example, if the high frame rate source needs to be switched to a low frame rate source, an address of the low frame rate source is reset to the player engine 130, and the player 170 starts to play a low frame rate video, thereby ensuring normal viewing of the video by the user.

In the video switching system shown in FIG. 1A, various module parameters, including a decoding capability and a rendering capability, that need to be involved during playing of a high bit rate video source are considered. Before a high frame rate source is requested, it is ensured that the current device can normally play a high frame rate source, thereby ensuring a high quality playing experience for the user. In addition, by using a frame loss rate detection mechanism, it is convenient to count a playing situation of high frame rate sources played by the user, and a playing result can be fed back in time, thereby facilitating timely processing by the player upper layer, and avoiding affecting the playing quality for the user. For an error and frame freezing that occur during playing, the frame rate reduction processing is added, to ensure normal viewing for the user when the playing is abnormal.

The video switching system shown in FIG. 1A faces a technical problem of how to achieve smooth switching during switching between video sources at different bit rates.

Figure 1B:
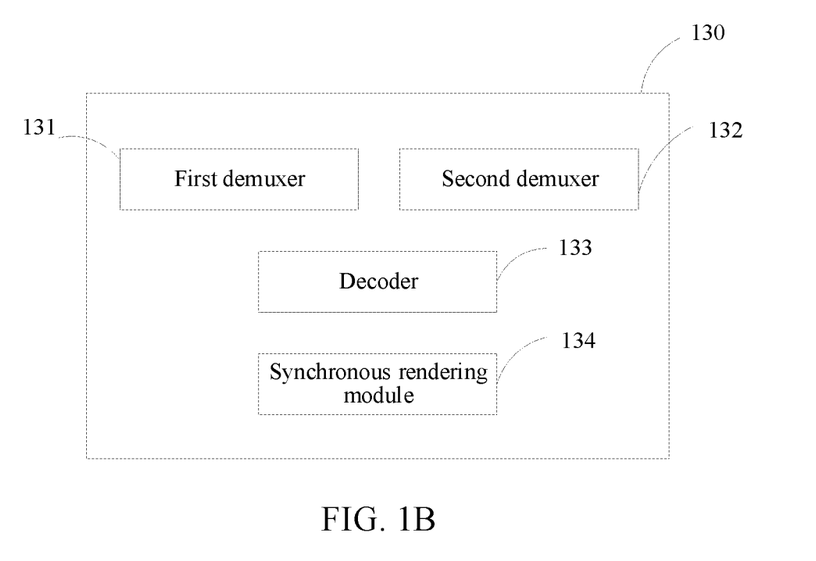
FIG. 1B is a structural block diagram of a player engine according to an embodiment of this application.

FIG. 1B is a structural diagram of the player engine 130 according to an embodiment of this application. The player engine 130 includes: a first demuxer 131, a second demuxer 132, a decoder 133, and a synchronous rendering module 134. The demuxers mainly complete parsing and downloading of data. During parsing, the demuxers parse a timestamp of each corresponding packet according to format standards of video sources. The first demuxer 131 is configured to locate and open an address of a first video source, and parse and download data of the first video source. The second demuxer 132 is configured to locate and open an address of a second video source, and parse and download data of the second video source. Both the first demuxer 131 and the second demuxer 132 store the parsed and downloaded data in a buffer queue. The decoder 133 can decode the data in the buffer queue, and the synchronous rendering module 134 synchronously renders the decoded data to a display screen to implement video playing.

To achieve smooth switching operations between video sources at different bit rates, an embodiment of this application provides a video source switching method. In the method, during switching between video sources at different bit rates, a switching moment of a new video source is set as a time value of a key frame corresponding to an original video source, thereby resolving the problem that images after the switching are discontinuous. The switching method may be applied to a user terminal, or may be applied to a server, or may be applied to a hardware implementation environment including the user terminal and the server. In addition, the switching method may alternatively be software, such as an application having a video source switching function, run on the user terminal or the server. The user terminal may be a smartphone, a tablet computer, a notebook computer, a desktop computer, a smart speaker, a smartwatch, or the like, but is not limited thereto. The server may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a CDN, big data, and an artificial intelligence platform.

Figure 2:
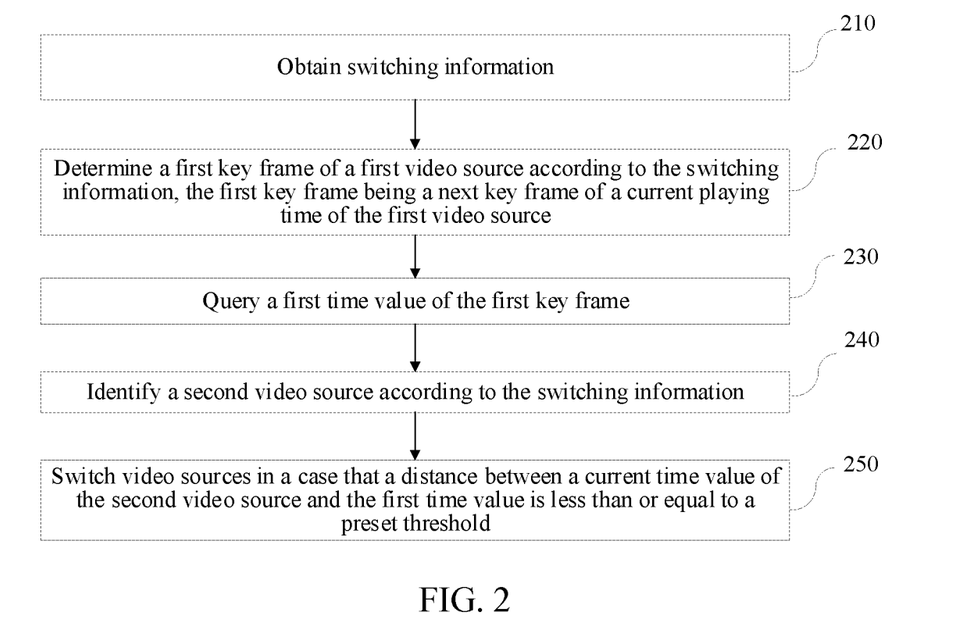
FIG. 2 is a flowchart of a video source switching method according to an embodiment of this application.

FIG. 2 is a flowchart of an application example when the switching method is applied to a user terminal. In one embodiment, the switching method may be performed by the player 170 installed in the user terminal shown in FIG. 1A, and the first video source and the second video source involved in switching are video sources at different bit rates. Referring to FIG. 2, the method may include the following steps 210 to 250.

Step 210: Obtain switching information.

In one embodiment, the switching information may include information of an address such as a url address of a to-be-switched second video source, and may further include time information triggered by a video switching event. The video switching event includes any one of a switching request event, a playing error event, or a frame freezing event from a user terminal.

In this embodiment, the switching information may be obtained by detecting status information of a dynamic update address interface. The dynamic update address interface is an interface provided by the player engine 130, and the player upper layer 150 may invoke the interface to set the url address, which is similar to updateSourceDataUrl( ) to update the address of the to-be-switched second video source. In this dynamic update manner, the player may also invoke the interface to set a switching address during playing without affecting video playing.

Step 220: Determine a first key frame of the first video source according to the switching information, the first key frame being a next key frame of a current playing time of the first video source.

Step 230: Query a first time value of the first key frame.

Steps 220 to 230 are performed by the first demuxer 131 shown in FIG. 1B. After the player upper layer 150 sets the address of the to-be-switched second video source to the dynamic update address interface, the player engine 130 detects that there is a to-be-switched address, and informs the first demuxer 131 of the video switching event. The first demuxer 131 queries a time value of the first key frame (that is, the first time value). After obtaining the first time value, the first demuxer 131 stops work and no longer requests data. The first time value may be a value of time such as a moment or a timestamp corresponding to the first key frame. Generally, the first time value may be obtained by querying the timestamp.

Step 240: Locate the second video source according to the switching information.

As described above, the switching information includes the address of the second video source. Therefore, the second video source may be located and opened according to the switching information.

Step 250: Perform video source switching when a distance between a current time value of the second video source and the first time value is less than or equal to a preset threshold.

When the distance between the current time value and the first time value meets a condition of the preset threshold, it is considered that the data of the second video source has reached a playing position of the first key frame of the first video source, and synchronous rendering processing is performed to perform the video source switching. The preset threshold may be reasonably set to a value that is small enough, so that the video switching is imperceptible to a viewer. The preset threshold may be set to 80 ms, or may be set to 60 ms or 50 ms. The specific value is not limited herein, and may be set according to a playing parameter and a condition under which the switching is imperceptible to the viewer. The smooth switching between video sources at different bit rates is achieved by setting the switching moment at a position so that a distance between the switching moment and the first time value is less than the preset threshold.

In this embodiment, in some cases, if there is a frame at the same moment as the first time value in the second video source, the video source switching may be performed when the current time value of the second video source is equal to the first time value. In some cases, if there is no frame at the same moment as the first time value in the second video source, the video source switching may be performed when the current time value is greater than or less than the first time value and the distance between the current time value and the first time value is less than or equal to the preset threshold.

In this embodiment, the current time value of the second video source may be compared with the first time value, and the video source switching is performed until the current time value is greater than or equal to the first time value and the distance between the current time value to the first time value is less than or equal to the preset threshold. The manner of determining the position of the switching moment is convenient and easy to implement.

In the video source switching method provided in this embodiment, during switching between video sources at different bit rates, a switching moment of the second video source is set as a time value of a key frame corresponding to the first video source, to achieve the smooth switching between the video sources at different bit rates, thereby resolving the technical problem that images are discontinuous in the related art.

Figure 3:
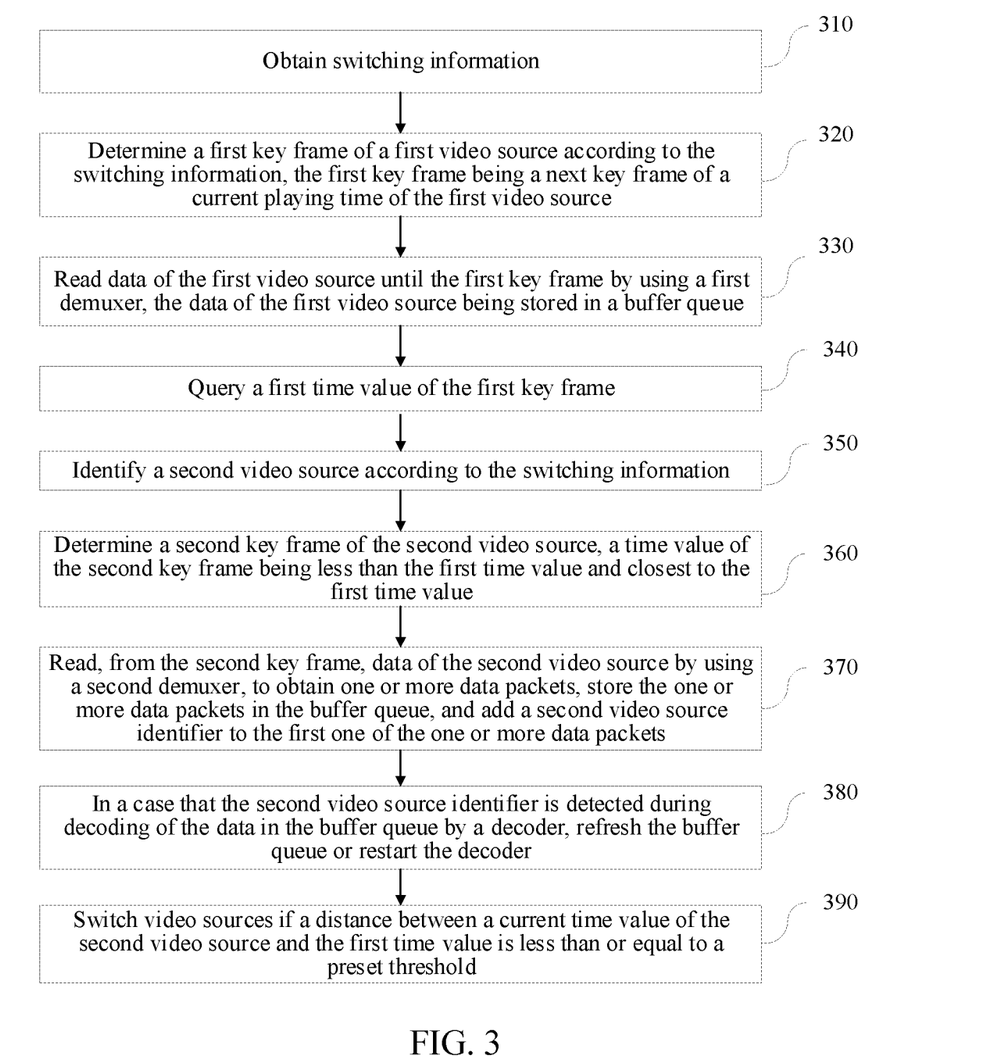
FIG. 3 is a flowchart of a video source switching method according to another embodiment of this application.

FIG. 3 is a flowchart of a video source switching method according to another embodiment of this application. This embodiment is also described by using an example in which the method is applied to the implementation environment shown in FIG. 1A. The method is performed by the player 170 installed in the user terminal shown in FIG. 1A. In the method, a first video source and a second video source involved in switching are video sources at different bit rates. Referring to FIG. 3, the method may include the following steps:

Step 310: Obtain switching information.

Content of the switching information and the method for obtaining the switching information are the same as those in step 210, and details are not described herein again.

Step 320: Determine a first key frame of the first video source according to the switching information, the first key frame being a next key frame of a current playing time of the first video source.

Step 330: Read data of the first video source until the first key frame by using a first demuxer, the data of the first video source being stored in a buffer queue.

Step 340: Query a first time value of the first key frame.

Steps 320 to 340 are performed by the first demuxer 131 shown in FIG. 1B. After the player upper layer 150 sets the address of the to-be-switched second video source to the dynamic update address interface, the player engine 130 detects that there is a to-be-switched address, and informs the first demuxer 131 of the video switching event. The first demuxer 131 continuously reads the data of the first video source until a next key frame of a current playing event, that is, the first key frame, and stores the read data in the buffer queue of the player engine 130. A size of the buffer queue is set according to a comprehensive consideration of parameters such as playing performance, for example, may be set to 150 frames. The specific size is not limited herein. Since data of the to-be-switched second video source has not been obtained, and the player is not ready for work of switching playing, continuous reading and caching of the data of the first video source buys time for the work of the switching playing. When the first demuxer 131 queries the time value of the first key frame (that is, the first time value), the first demuxer 131 stops work and no longer requests data. The first time value may be a value of time such as a moment or a timestamp corresponding to the first key frame. Generally, the first time value may be obtained by querying the timestamp.

Step 350: Identify the second video source according to the switching information.

As described above, the switching information includes the address of the second video source. Before step 350, the method may further include a step of creating the second demuxer 132. The second demuxer 132 is started to locate the second video source.

Step 360: Determine a second key frame of the second video source, a time value of the second key frame being less than the first time value and closest to the first time value.

Step 370: Read, from the second key frame, data of the second video source by using the second demuxer, to obtain one or more data packets, store the one or more data packets in the buffer queue, and add a second video source identifier to the first one of the one or more data packets.

Steps 350 to 370 are performed by the second demuxer 132. After the second video source is located and opened, the second demuxer 132 performs a seek operation in the opened second video source by using a backward mode, to find a key frame before the first time value and closest to the first time value, which is defined as the second key frame. Since the seek operation is performed by using the backward mode, the determined time value of the second key frame (that is, the second time value, which may be a value of time such as a moment or a timestamp corresponding to the second key frame) needs to be less than the first time value. The second demuxer 132 stores, from the second key frame, the read data of the second video source in the buffer queue.

At this point, the buffer queue has stored the data of the first video source and the data of the second video source. In this embodiment, the seek operation refers to an operation of searching for a target position. For example, in step 360, assuming that the value of the time (that is, the first time value) such as the moment or the timestamp corresponding to the first key frame is 2700 ms, the target position to be searched for by the seek operation is a position of a key frame in the second video source, and a value of time (that is, the second time value) such as a moment or a timestamp corresponding to the position of the key frame is less than 2700 ms and closest to the 2700 ms.

In this embodiment, the first demuxer is turned off after the data of the second video source is successfully read.

Step 380: When the second video source identifier is detected during decoding of the data in the buffer queue by a decoder, refresh the buffer queue or restart the decoder.

In this embodiment, the data in the buffer queue may be decoded by using the decoder 133. Since data of the first video source before the first key frame is also in the buffer queue, the decoder 133 continuously decodes and synchronously renders the data of the first video source before the first key frame.

When the second video source identifier is detected during decoding, a flush function is invoked to refresh the buffer queue or restart the decoder 133. The first video source and the second video source are video sources at different bit rates. If encoding parameters of the first video source and the second video source are inconsistent, the decoder 133 needs to be restarted. If the parameters of the first video source and the second video source are consistent, there is no need to restart the decoder. In this case, the flush function needs to be invoked to refresh the buffer queue, which saves time consumed for restarting the decoder. For example, if the first video source and the second video source are video sources at different frame rates, the encoding parameters of the first video source and the second video source are consistent, and switching time can be saved by using the method of refreshing the buffer queue by invoking the flush function.

Step 390: Switch video sources when a distance between a current time value of the second video source and the first time value is less than or equal to a preset threshold.

When the refreshing or restarting is completed, the data of the second video source is decoded again, and a distance between a current time value of the data to the first time value is determined. When the distance is less than or equal to the preset threshold, video source switching is performed. When the distance between the current time value and the first time value meets a condition of the preset threshold, it is considered that the data of the second video source has reached a playing position of the first key frame of the first video source, and synchronous rendering processing is performed to perform the video source switching. Setting of the preset threshold and the method for determining the video source switching moment are the same as those in step 250, and details are not described herein.

In this embodiment, step 390 is performed from the second key frame, which helps to quickly find the switching moment.

Figure 4:
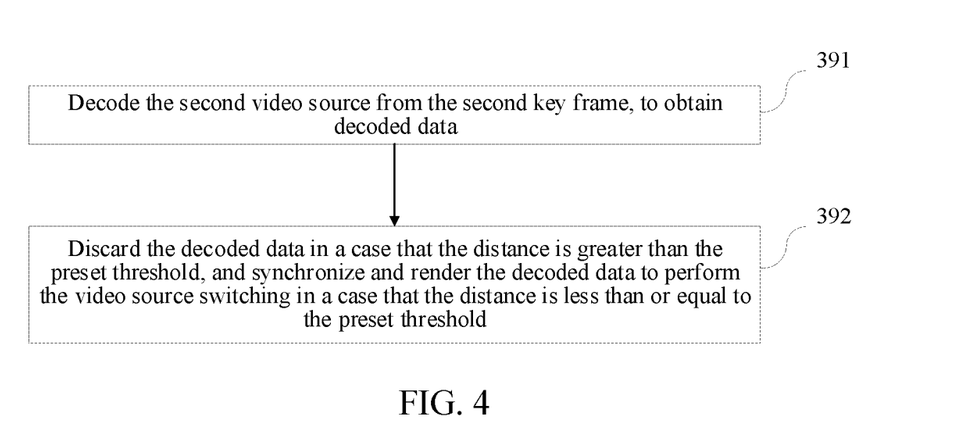
FIG. 4 is a flowchart of an implementation of step 390 in FIG. 3.

In one embodiment, step 390 may include step 391 and step 392 shown in FIG. 4.

Step 391: Decode the second video source from the second key frame, to obtain decoded data.

Step 392: Discard the decoded data when the distance is greater than the preset threshold, and synchronize and render the decoded data when the distance is less than or equal to the preset threshold, to perform the video source switching.

In step 391 and step 392, quick decoding processing is implemented. Before the switching moment is reached, the decoded data is discarded, and synchronization and rendering are not performed, thereby saving synchronization and rendering time. Until the switching moment is reached, that is, the current time value meets the condition of the preset threshold, the decoded data is synchronized and rendered to perform the video source switching.

In the video source switching method provided in this embodiment, there is no need to restart the entire player. A process of restarting the player is mainly as follows: Create a player resource ((thread creation, initialization of a parameter setting, and the like); the demuxer establishes a connection and downloads the data according to the address; the decoder is restarted and performs decoding; and the rendering module is restarted and performs rendering. The whole process may consume 700 ms to 900 ms, and a black screen occurs within this time period. When the player is restarted with a new video source address being used, it is needed to seek to the previous playing position. If a position fed back by seek is different from the previous playing position, it indicates that data of the position fed back by the seek is not aligned with data of the previous playing position, resulting in images that are discontinuous. In addition, if a time value of the position fed back by the seek is less than a time value of the previous playing position, images are repeated.

In this embodiment, during switching between video sources at different bit rates, a switching moment of the second video source is set as a time value of a key frame corresponding to the first video source, to achieve the smooth switching between the video sources at different bit rates, thereby resolving the technical problem that images after the switching are discontinuous in the related art. In addition, the method reduces time for creating the player and initializing the parameter is reduced, and time consumed for creating the rendering module. Especially, in a case of consistent encoding parameters of different video sources, time consumed for restarting the decoder is also reduced. The switching process consumes about 200 ms to 300 ms in total. In addition, since the rendering module is not recreated, frames displayed previously are continuously displayed on the screen. Therefore, the black screen does not occur, and due to short switching time, the video switching is basically imperceptible to the user.

Figure 5:
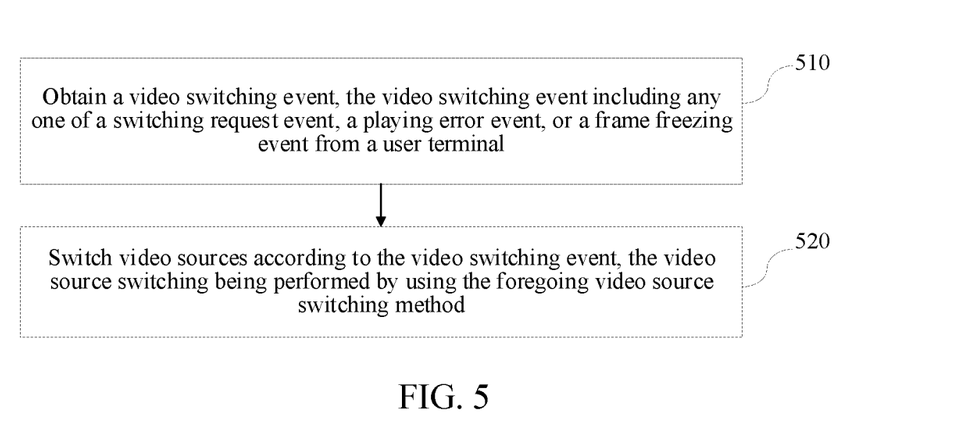
FIG. 5 is a flowchart of a video playing method according to an embodiment of this application.

FIG. 5 is a flowchart of a video playing method according to an embodiment of this application. The video playing method is interactively performed by the player 170 and the server 110 shown in FIG. 1A, and includes the following steps 510 to 520.

Step 510: Obtain a video switching event, the video switching event including any one of a switching request event, a playing error event, or a frame freezing event from a user terminal. Step 510 is performed by the player 170 installed in the user terminal, and for example, is performed by the player upper layer 150 in the player 170. For a specific video switching event, reference may be made to the description of the various video switching events obtained by the player upper layer 150 in FIG. 1A.

Step 520: Switch video sources according to the video switching event, the video source switching being performed by using the foregoing video source switching method.

In the video playing method provided in this embodiment, the video source switching is performed according to the video switching event, to achieve smooth switching between different video sources during video playing.

Figure 6:
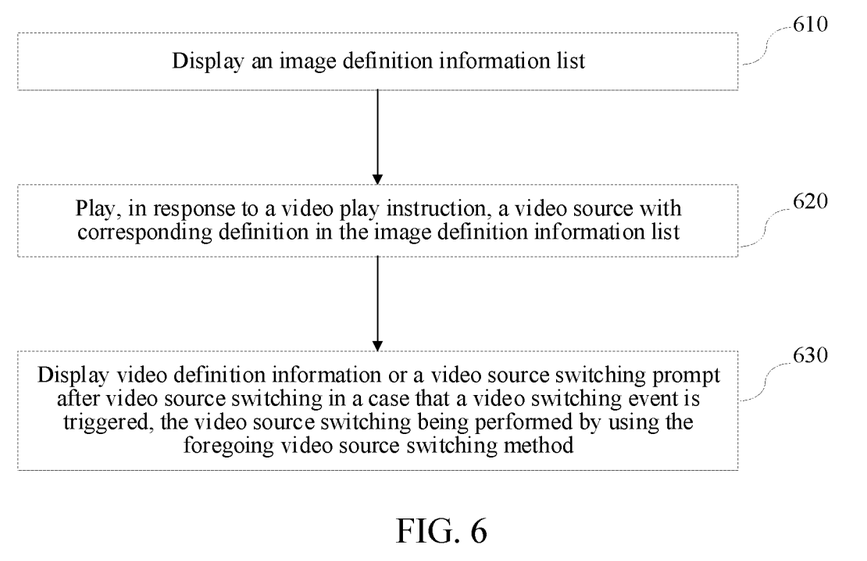
FIG. 6 is a flowchart of a video playing method according to another embodiment of this application.

FIG. 6 is a flowchart of a video playing method according to another embodiment of this application. The video playing method is performed by the player 170 installed in the user terminal shown in FIG. 1A, and includes the following steps 610 to 630.

Step 610: Display an image definition information list. A video playing interface of the user terminal displays the image definition information list for a user to select video sources with different definitions.

Step 620: Play a video source with corresponding definition in the image definition information list in response to a video playing instruction.

Figure 7A:
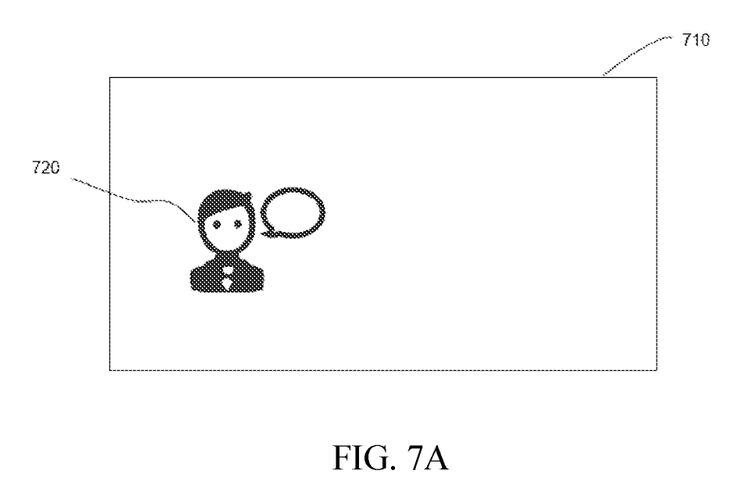
FIG. 7A to FIG. 7D are display interfaces in an execution process of the embodiment shown in FIG. 6.
Figure 7B:
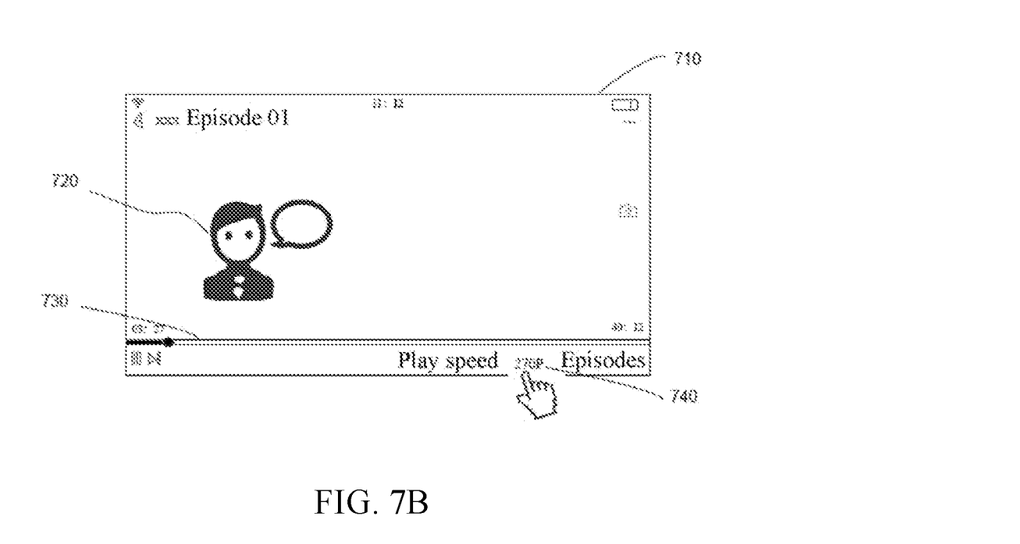
Figure 7C:
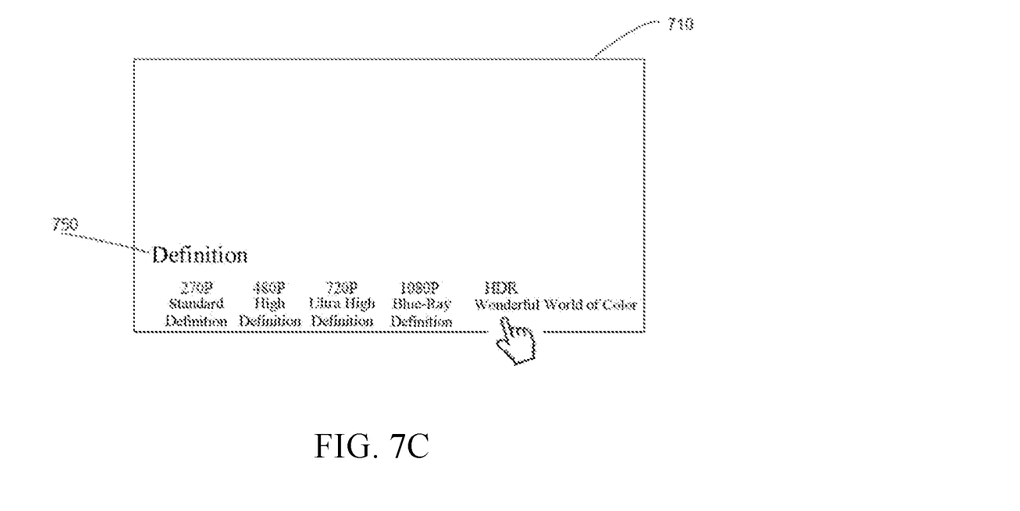

FIG. 7A to FIG. 7D show display interfaces of a user terminal during video playing. FIG. 7A is a display interface during video playing, and the display interface 710 displays a currently played video 720. FIG. 7B is a display interface after an instruction touched by a user is obtained by the interface. In this case, a function list 740 is displayed on the interface. The function list 740 includes a link used for triggering the image definition information list, such as "270P" shown in the figure. After the user taps the "270P", a display interface for the user to select definition shown in FIG. 7C is entered, and an image definition information list 750 is displayed. The user may select a desired definition option from the image definition information list 750. For example, after the user taps the "HDR Wonderful World of Color", a video source with "HDR" definition is played in response to the video playing instruction. The HDR (High-dynamic-range) represents high-dynamic-range imaging, which can improve an exposure dynamic range of an image, thereby obtaining a better image display experience.

Step 630: Display video image definition information or a video source switching prompt after video source switching when a video switching event is triggered, the video source switching being performed by using the foregoing video source switching method.

Figure 7D:
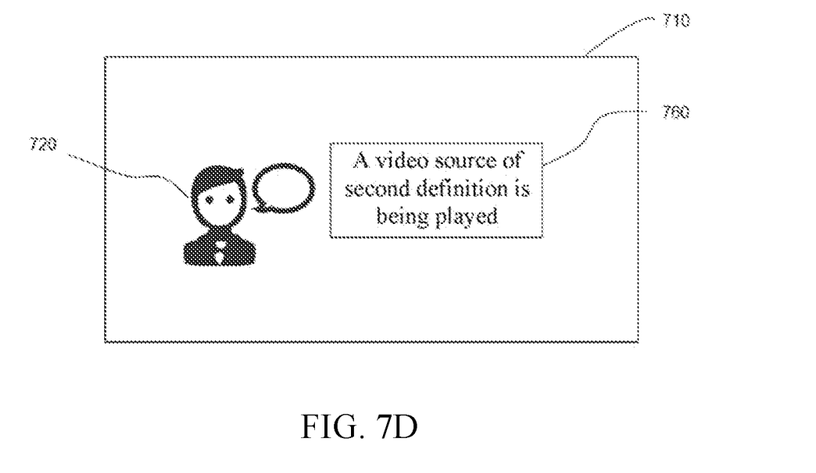

FIG. 7D shows a display interface after the video source switching. Content in an information prompt box 760 is "a video source of second definition is being played". The information prompt box 760 is used for prompting information about the video source switching. In this embodiment, video image definition information after switching may be directly displayed on the display interface. For example, the "second definition" may be displayed on the upper right or bottom right of the display interface.

For example, the video switching event includes any one of a switching request event, a playing error event, or a frame freezing event from the user terminal.

Referring to the display interfaces shown in FIG. 7A to FIG. 7D, the method in this embodiment is applied to video playing, and a specific process is as follows:

In the display interface during video playing shown in FIG. 7A, the user may enable the player to enter the display interface shown in FIG. 7B by touching the display interface 710 or another operation method. The display interface in FIG. 7B displays the currently played video 720, a progress bar 730, and the function list 740. Different options in the function list 740 are used for opening corresponding option lists, so that the user can freely select corresponding option information. The option "270P" in the list 740 is image definition information of the video source of the currently played video, and the option can be linked to the image definition information list 750 in FIG. 7C.

After the user taps the option "270P", the display interface shown in FIG. 7C is entered. The image definition information list 750 on the display interface includes a plurality of definition options, and for example, are 270P Standard Definition, 480P High Definition, 720P Ultra High Definition, 1080P Blue-Ray Definition, and HDR Wonderful World of Color. The switching request event from the user terminal may be triggered by tapping any one of the definition options. The switching request event includes image definition information of a to-be-switched video source. Different image definition information corresponds to video sources at different bit rates stored in the server 110. The above definition options are merely examples. Names and the number of the definition options, and the image definition information represented by the definition options may be flexibly set, which are not limited herein.

The switching request event is triggered when the user taps any one of the definition options. After obtaining the switching request event, the player upper layer 150 updates the dynamic update address interface in the player engine 130. In addition, during the current video playing, if the player engine 130 detects a playing error or frame freezing, the player engine 130 sends a playing error event or a frame freezing event to the bit rate switching processing module 140. The bit rate switching processing module 140 determines whether to perform bit rate reduction processing according to the playing error event and frame freezing event sent by the player engine 130 and a bit rate of the source with an error, and informs the player upper layer 150 of the video switching event. It can be seen that the video switching event that can be obtained by the player upper layer 150 includes the switching request event, the playing error event, and the frame freezing event from the user terminal.

The player engine 130 obtains switching information corresponding to image definition information selected by the user by detecting the status information of the dynamic update address interface. According to the switching information, the player engine 130 performs the video source switching method shown in the foregoing embodiment, to complete smooth switching between video sources.

For example, when the user taps the "HDR Wonderful World of Color" option, that is, when the switching request event from the user terminal is triggered, a user playing instruction is generated. After completing switching to a HDR video source in response to the user playing instruction, the player displays video source switching prompt information shown in the information prompt box 760 in FIG. 7D, to prompt the user that video source switching has been completed.

In this embodiment, for the user playing instruction generated according to the playing error event or frame freezing event, the player may also display the video source switching prompt information in the information prompt box 760 after completing video source switching in response to the user playing instruction.

A specific description about the image definition information, and displayed specific content and positions of the involved information such as the prompt information on the display interfaces may be flexibly set, which are not limited herein.

In the video playing method provided in this embodiment, the video source switching is performed according to the video switching event, to achieve smooth switching during video playing.

Figure 8:
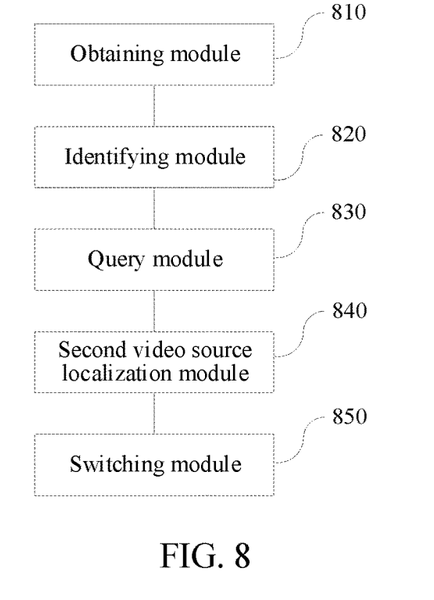
FIG. 8 is a structural block diagram of a video source switching apparatus according to an embodiment of this application.

FIG. 8 is a schematic diagram of a video source switching apparatus according to an embodiment of this application. The apparatus includes an obtaining module 810, a identifying module 820, a query module 830, a second video source identifying module 840, and a switching module 850.

The obtaining module 810 is configured to obtain switching information.

The identifying module 820 is configured to determine a first key frame of a first video source according to the switching information, the first key frame being a next key frame of a current playing time of the first video source.

The query module 830 is configured to query a first time value of the first key frame.

The second video source identifying module 840 is configured to identify a second video source according to the switching information.

The switching module 850 is configured to perform video source switching when a distance between a current time value of the second video source and the first time value is less than or equal to a preset threshold.

According to the video source switching apparatus provided in this embodiment, during switching between video sources at different bit rates, a switching moment of the second video source is set as a time value of a key frame corresponding to the first video source, to achieve the smooth switching between the video sources at different bit rates.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

An embodiment of this application further provides a computer device, including a memory and a processor, the memory storing a computer program, and the computer program, when executed by the processor, causing the processor to perform the method in the foregoing embodiments.

In one embodiment, the computer device may be a user terminal, or may be a server.

Figure 9:
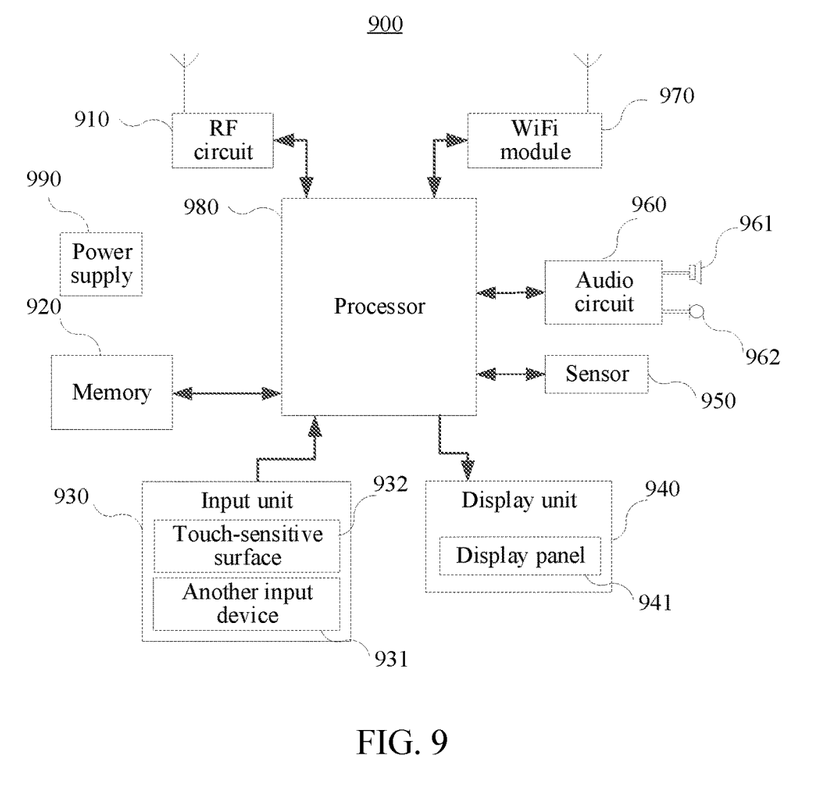
FIG. 9 is a structural block diagram of a computer device according to an embodiment of this application.

In this embodiment, an example in which the computer device is a user terminal is used, is as follows:

As shown in FIG. 9, the computer device 900 may include components such as a radio frequency (RF) circuit 910, a memory 920 including one or more computer readable storage media, an input unit 930, a display unit 940, a sensor 950, an audio circuit 960, a short-range wireless communications module 970, a processor 980 including one or more processing cores, and a power supply 990. A person skilled in the art may understand that the device structure shown in FIG. 9 does not constitute a limitation to the electronic device. The computer device may include more or fewer components than those shown in the figure, or some components may be combined, or a different component deployment may be used.

The RF circuit 910 may be configured to receive and transmit signals during an information receiving and transmitting process or a call process. Particularly, after receiving downlink information from a base station, the RF circuit delivers the downlink information to one or more processors 980 for processing, and transmits related uplink data to the base station. Generally, the RF circuit 910 includes, but not limited to, an antenna, at least one amplifier, a tuner, one or more oscillators, a subscriber identity module (SIM) card, a transceiver, a coupler, a low noise amplifier (LNA), and a duplexer. In addition, the RF circuit 910 may also communicate with a network and another device through wireless communication. The wireless communication may use any communication standard or protocol, which includes, but not limited to, Global system for mobile communication (GSM), general packet radio service (GPRS), Code Division Multiple Access (CDMA), Wideband Code Division Multiple Access (WCDMA), Long Term Evolution (LTE), email, short messaging service (SMS), and the like.

The memory 920 may be configured to store a software program and a module. The processor 980 runs the software program and the module stored in the memory 920, to implement various functional applications and data processing. The memory 920 may mainly include a program storage area and a data storage area. The program storage area may store an operating system, an application program required by at least one function (such as a sound playback function and an image display function), and the like. The data storage area may store data (such as audio data and an address book) created according to the use of the device 900, and the like. In addition, the memory 920 may include a high-speed random access memory, and may further include a nonvolatile memory, such as at least one magnetic disk storage device, a flash memory, or another volatile solid-state storage device. Correspondingly, the memory 920 may further include a memory controller, so as to provide access of the processor 980 and the input unit 930 to the memory 920. Although FIG. 9 shows the RF circuit 910, it may be understood that the wireless communications unit is not a necessary component of the device 900, and when required, the wireless communications unit may be omitted as long as the scope of the essence of the present disclosure is not changed.

The input unit 930 may be configured to receive input digit or character information, and generate a keyboard, mouse, joystick, optical, or track ball signal input related to a user setting and function control. For example, the input unit 930 may include a touch-sensitive surface 932 and another input device 931. The touch-sensitive surface 932 may also be referred to as a touch display screen or a touch panel, and may collect a touch operation of a user on or near the touch-sensitive surface (such as an operation of a user on or near the touch-sensitive surface 932 by using any suitable object or accessory, such as a finger or a stylus), and drive a corresponding connection apparatus according to a preset program. In this embodiment, the touch-sensitive surface 932 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and transmits the touch point coordinates to the 980. Moreover, the touch controller can receive and execute a command sent from the processor 980. In addition, the touch-sensitive surface 932 may be implemented by using various types, such as a resistive type, a capacitance type, an infrared type, and a surface sound wave type. In addition to the touch-sensitive surface 932, the input unit 930 may further include another input device 931. For example, the another input device 931 may include, but not limited to, one or more of a physical keyboard, a functional key (such as a volume control key or a switch key), a track ball, a mouse, and a joystick.

The display unit 940 may be configured to display information input by the user or information provided for the user, and various graphical user interfaces of the device 900. The graphical user interfaces may be formed by a graph, a text, an icon, a video, or any combination thereof. The display unit 940 may include a display panel 941. In this embodiment, the display panel 941 may be configured by using a liquid crystal display (LCD), an organic light-emitting diode (OLED), or the like. Further, the touch-sensitive surface 932 may cover the display panel 941. After detecting a touch operation on or near the touch-sensitive surface 932, the touch-sensitive surface 932 transfers the touch operation to the processor 980, so as to determine a type of a touch event. Then, the processor 980 provides corresponding visual output on the display panel 941 according to the type of the touch event. Although, in FIG. 9, the touch-sensitive surface 932 and the display panel 941 are used as two separate parts to implement input and output functions, in some embodiments, the touch-sensitive surface 932 and the display panel 941 may be integrated to implement the input and output functions.

The computer device 900 may further include at least one sensor 950, for example, an optical sensor, a movement sensor, and another sensor. For example, the optical sensor may include an ambient light sensor and a proximity sensor. The ambient light sensor may adjust luminance of the display panel 941 according to brightness of the ambient light. The proximity sensor may switch off the display panel 941 and/or backlight when the device 900 is moved to the ear. As one type of motion sensor, a gravity acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the device 900, are not further described herein.

The audio circuit 960, a speaker 961, and a microphone 962 may provide audio interfaces between the user and the device 900. The audio circuit 960 may convert received audio data into an electric signal and transmit the electric signal to the speaker 961. The speaker 961 converts the electric signal into a sound signal for output. On the other hand, the microphone 962 converts a collected sound signal into an electric signal. The audio circuit 960 receives the electric signal and converts the electric signal into audio data, and outputs the audio data to the processor 980 for processing. Then, the processor 980 sends the audio data to, for example, another control device by using the RF circuit 910, or outputs the audio data to the memory 920 for further processing. The audio circuit 960 may further include an earplug jack, so as to provide communication between a peripheral earphone and the device 900.

The short-range wireless communications module 970 may be a wireless fidelity (WiFi) module, a Bluetooth module, an infrared module, or the like. The device 900 may transmit, by using the short-range wireless communications module 970, information to a wireless transmission module that is set in a battle device.

The processor 980 is a control center of the device 900, and is connected to various parts of the entire control device by using various interfaces and lines. By running or executing a software program and/or module stored in the memory 920, and invoking data stored in the memory 920, the processor performs various functions and data processing of the device 900, thereby performing overall monitoring on the control device. In this embodiment, the processor 980 may include the one or more processing cores. In this embodiment, the processor 980 may integrate an application processor and a modem processor. The application processor mainly processes an operating system, a user interface, an application program, and the like. The modem processor mainly processes wireless communication. It may be understood that the modem processor may not be integrated into the processor 950.

The device 900 further includes the power supply 990 (such as a battery) for supplying power to the components. In this embodiment, the power supply may be logically connected to the processor 980 by using a power management system, thereby implementing functions such as charging, discharging, and power consumption management by using the power management system. The power supply 990 may further include one or more of a direct current or alternating current power supply, a re-charging system, a power failure detection circuit, a power supply converter or inverter, a power supply state indicator, and any other component.

Although not shown in the figure, the device 900 may further include a camera, a Bluetooth module, and the like, which are not further described herein.

An embodiment of this application further provides a computer-readable storage medium, storing a computer program, the computer program, when executed by a processor, causing the processor to perform the method in the foregoing embodiments.

The terms such as "first", "second", "third", and "fourth" (if any) in the specification and accompanying drawings of this application are used for distinguishing similar objects and not necessarily used for describing any particular order or sequence. Data used in this way is interchangeable in a suitable case, so that the embodiments of this application described herein can be implemented in a sequence in addition to the sequence shown or described herein. Moreover, the terms "include", "contain", and any other variants thereof mean to cover the non-exclusive inclusion. For example, a process, method, system, product, or an apparatus that includes a list of steps or units is not necessarily limited to those steps or units that are clearly listed, but may include other steps or units not expressly listed or inherent to such a process, method, system, product, or an apparatus.

It should be understood that, in this embodiment, "at least one" means one or more, and "a plurality of" means two or more. "And/or" is used to describe an association between associated objects, and indicates that there may be three types of relationships. For example, "A and/or B" may indicate that only A exists, only B exists, and both A and B exist, where A and B may be singular or plural. The character "/" in this specification generally indicates an "or" relationship between the associated objects. "At least one of the following items" or a similar expression means any combination of these items, including a single item or any combination of a plurality of items. For example, at least one of a, b, or c may represent a, b, c, "a and b", "a and c", "b and c", or "a, b, and c", where a, b, and c may be singular or plural.

In the several embodiments provided in this application, it should be understood that the disclosed system, apparatus, and method may be implemented in other manners. For example, the described apparatus embodiment is merely an example. For example, the unit division is merely a logical function division and may be other division in various embodiments. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separated, and the components displayed as units may or may not be physical units, and may be located in one place or may be distributed over a plurality of network units. Some or all of the units may be selected according to the needs to achieve the objectives of the solutions of the embodiments.

In addition, functional units in the embodiments of this application may be integrated into one processing unit, or each of the units may be physically separated, or two or more units may be integrated into one unit. The integrated unit may be implemented in the form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer apparatus (which may be a personal computer, a server, a network apparatus, or the like) to perform all or some of the steps of the methods described in the embodiments of this application. The foregoing storage medium includes various media capable of storing program codes, such as, a USB flash drive, a mobile hard disk, a Read Only Memory (ROM), a Random Access Memory (RAM), a magnetic disk, or an optical disc.

Step numbers in the foregoing method embodiments are set only for ease of description, and constitute no limitation to a sequence of the steps. The sequence of performing the steps in the embodiments may be adaptively adjusted based on understanding of a person skilled in the art.

The embodiments of this application are described above in detail, but this application is not limited to the above embodiments. A person skilled in the art may further make various equivalent variations or replacements without departing from the spirit of this application, and the equivalent variations or replacements are all included within the scope defined by the claims of this application.

What is claimed is:

1. A video source switching method, comprising:
obtaining switching information;
determining a first key frame of a first video source according to the switching information, the first key frame being a next key frame of a current playing time of the first video source;
querying a first time value of the first key frame;
identifying a second video source according to the switching information;
after identifying the second video source, determining a second key frame of the second video source, a time value of the second key frame being less than the first time value and being closest to the first time value; and
switching video sources from the second key frame if a distance between a current time value of the second video source and the first time value is less than or equal to a threshold.

2. The method according to claim 1, wherein after the determining a first key frame of a first video source according to the switching information, the method further comprises:
reading data of the first video source up to the first key frame by using a first demuxer, the data of the first video source being stored in a buffer queue.

3. The method according to claim 2, wherein after the determining a second key frame of the second video source, the method further comprises:
reading, from the second key frame data of the second video source by using a second demuxer, to obtain one or more data packets, storing the one or more data packets in the buffer queue, and adding a second video source identifier to the first one of the one or more data packets.

4. The method according to claim 3, further comprising:
turning off the first demuxer after the data of the second video source is successfully read.

5. The method according to claim 3, further comprising:
if the second video source identifier is detected during decoding of the data in the buffer queue by a decoder, refreshing the buffer queue or restarting the decoder.

6. The method according to claim 1, wherein the switching video sources if a distance between a current time value of the second video source and the first time value is less than or equal to a threshold comprises:
decoding the second video source from the second key frame, to obtain decoded data;
discarding the decoded data if the distance is greater than the threshold; and
synchronizing and rendering the decoded data if the distance is less than or equal to the threshold, to switching the video sources.

7. The method according to claim 1, wherein the obtaining switching information comprises:
obtaining the switching information by detecting status information of a dynamic update address interface.

8. The method according to claim 1, wherein the first video source and the second video source are video sources at different frame rates.

9. The method according to claim 1, wherein obtaining switching information further comprises:
obtaining a video switching event, the video switching event comprising any one of a switching request event, a playing error event, or a frame freezing event from a user terminal; and
switching the video sources comprises: switching video sources according to the video switching event.

10. The method according to claim 1, further comprising:
displaying an image definition information list;
playing a video source with corresponding definition in the image definition information list in response to a video playing instruction; and
displaying video image definition information or a video source switching prompt after switching the video sources triggered by a video switching event.

11. The method according to claim 10, wherein the video switching event comprises any one of a switching request event, a playing error event, or a frame freezing event from a user terminal.

12. A video source switching apparatus, comprising:
at least one memory and at least one processor, the at least one memory storing a computer program, and the computer program, when executed by the at least one processor, causing the at least one processor to perform: obtaining switching information;
determining a first key frame of a first video source according to the switching information, the first key frame being a next key frame of a current playing time of the first video source;
querying a first time value of the first key frame;
identifying a second video source according to the switching information;
after identifying the second video source, determining a second key frame of the second video source, a time value of the second key frame being less than the first time value and being closest to the first time value; and
switching video sources from the second key frame if a distance between a current time value of the second video source and the first time value is less than or equal to a threshold.

13. A non-transitory computer-readable storage medium, storing a computer program, the computer program, when executed by at least one processor, causing the at least one processor to perform:
obtaining switching information;
determining a first key frame of a first video source according to the switching information, the first key frame being a next key frame of a current playing time of the first video source;
querying a first time value of the first key frame;
identifying a second video source according to the switching information;
after identifying the second video source, determining a second key frame of the second video source, a time value of the second key frame being less than the first time value and being closest to the first time value; and
switching video sources from the second key frame if a distance between a current time value of the second video source and the first time value is less than or equal to a threshold.

14. The storage medium according to claim 13, wherein after the determining a first key frame of a first video source according to the switching information, the computer program further causes the at least one processor to perform:
reading data of the first video source up to the first key frame by using a first demuxer, the data of the first video source being stored in a buffer queue.

15. The storage medium according to claim 14, wherein after the determining a second key frame of the second video source, the computer program further causes the at least one processor to perform:
reading, from the second key frame data of the second video source by using a second demuxer, to obtain one or more data packets, storing the one or more data packets in the buffer queue, and adding a second video source identifier to the first one of the one or more data packets.

16. The storage medium according to claim 15, wherein the computer program further causes the at least one processor to perform:
turning off the first demuxer after the data of the second video source is successfully read.

17. The storage medium according to claim 15, wherein the computer program further causes the at least one processor to perform:
if the second video source identifier is detected during decoding of the data in the buffer queue by a decoder, refreshing the buffer queue or restarting the decoder.

18. The storage medium according to claim 13, wherein the switching video sources if a distance between a current time value of the second video source and the first time value is less than or equal to a threshold comprises:
decoding the second video source from the second key frame, to obtain decoded data;
discarding the decoded data if the distance is greater than the threshold; and
synchronizing and rendering the decoded data if the distance is less than or equal to the threshold, to switching the video sources.

* * * * *